May 11, 1965
J. A. WINKER
3,182,932
SIMULATED VARIABLE THICKNESS BALLOON
Filed Aug. 30, 1963
2 Sheets-Sheet 1
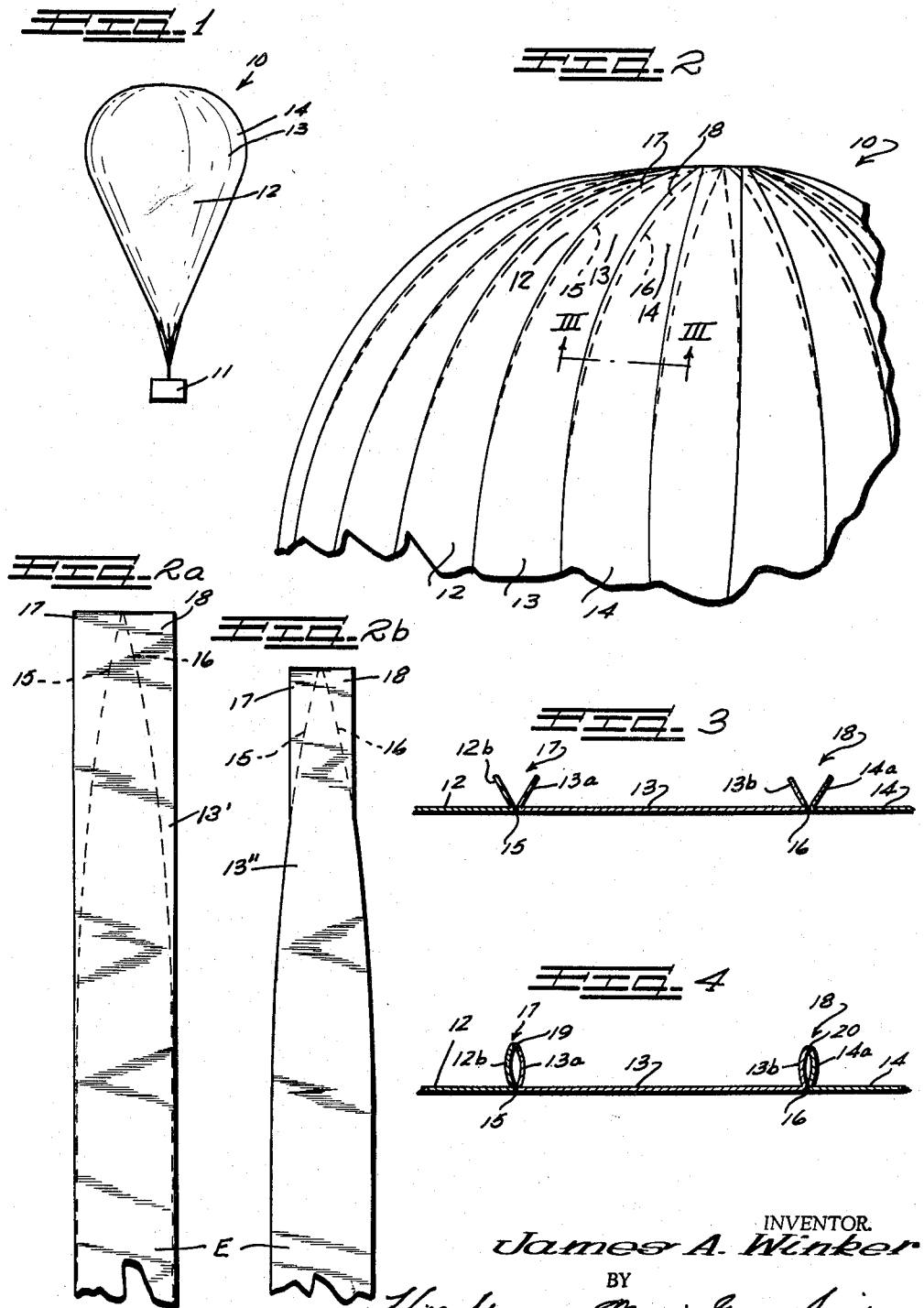
INVENTOR.
James A. Winker
BY
*Hill, Sherman, Meroni, Gross, Simpson*
ATTORNEYS May 11, 1965 J. A. WINKER 3,182,932
SIMULATED VARIABLE THICKNESS BALLOON
Filed Aug. 30, 1963 2 Sheets-Sheet 2
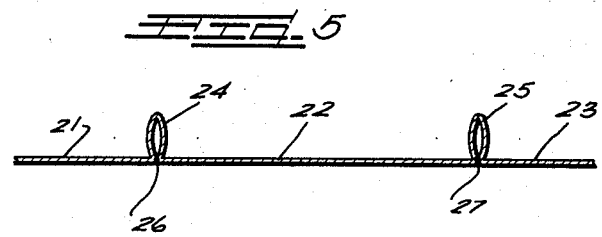
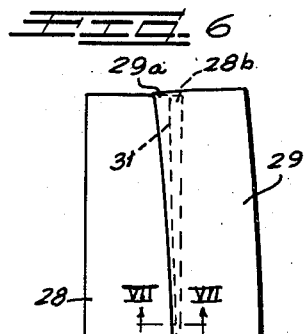
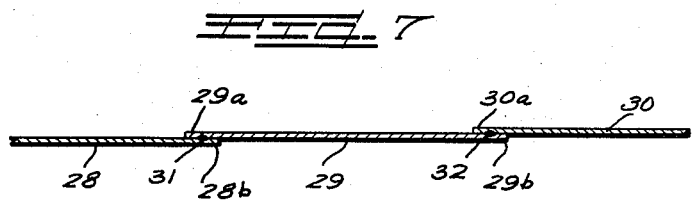
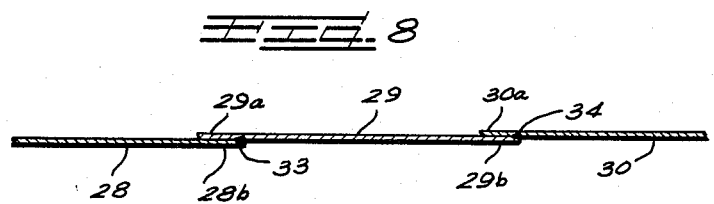
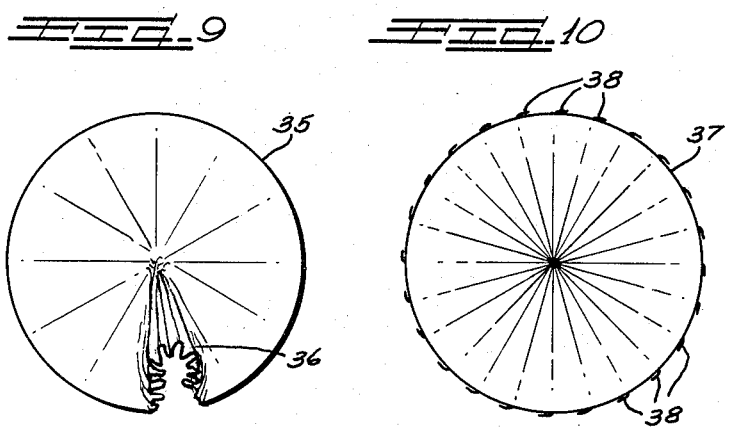
INVENTOR.
James H. Winker
BY
*Hill, Sherman, Meroni, Gross & Simpson*
ATTORNEYS

United States Patent Office 3,182,932
Patented May 11, 1965

3,182,932
SIMULATED VARIABLE THICKNESS BALLOON
James A. Winker, Sioux Falls, S. Dak., assignor to Raven Industries, Inc., Sioux Falls, S. Dak., a corporation of South Dakota
Filed Aug. 30, 1963, Ser. No. 305,789
6 Claims. (Cl. 244—31)

The present invention relates to improvements in load-carrying high altitude balloons and particularly to an improved balloon envelope structure and method of making the envelope.

The present invention is used primarily with balloons formed of light-weight flexible gas barrier material such as polyethylene or other plastics wherein the material is formed in gores with the gores being attached to each other along seams to form the balloon envelope. An optimum design for a load-carrying balloon is one in which all stresses (at least vertical stresses) are uniform and equal at all points on the balloon skin. Non-uniformity in design which might produce stress concentrations would necessarily be avoided. This carried to its ultimate would mean elimination of any discreet reinforcing bands and all accessories. It would also mean that the material itself would have to be variable in tensile strength, and in order to accomplish this would have to be variable in thickness along its gore length. It would have to be a ductible, almost amorphous envelope whose shape is determined solely by the internal and external forces acting upon it.

In approaching a balloon with uniform vertical stresses practical approximations have employed the conventional polyethylene cylinder or semi-tailored balloons. These, of course, do not have nearly the strength required to carry the heavy pay loads being flown today. In fact, a size limitation exists for which the gas bubble cannot even support the balloon weight. The cylindrical or semi-tailored balloons are usually constructed tapeless and these balloons work because an adequate amount of material is contained throughout the gore length to support the loads involved. This is accomplished by including material in the gores extra to the requirements of the inflated contour in the upper and lower areas. As will be recognized by those skilled in the art, the balloon envelope forms a smooth contour at the equator and the extra material forms billows toward the ends of the balloon above and below the equator. The extreme example of a tapeless balloon is a cylinder balloon in which the originally formed envelope has a constant gore width from bottom to top and is in the shape of a cylinder with the ends of the cylinder gathered together. A cylinder balloon when floating can withstand loadings equal to the tensile strength of the material times its cross-sectional area. For example, for a six million cubic foot, one-half mil cylinder balloon, the strength of the material is approximately 5000 pounds. After subtracting the balloon weight (on the order of 700 pounds) and considering the cone angle, this fully inflated balloon could support a pay load of approximately 2700 pounds.

The limiting factor, however, is that at launch, the same lifting force must be restrained in a bubble about 47 feet in diameter. Though the full circumference of the 750 feet of material exists in this area only about 148 feet (bubble circumference) is operative. With the 3400 pounds of lift (2700 pounds load plus 700 pounds balloon), the stress in the balloon film would be 3900 p.s.i. or about 6 times the normally allowed stress level. The bubble necessary to lift just the 700 pound balloon is approximately 28 feet in diameter and this bubble material would be stressed to 1400 p.s.i., well above the accepted limit.

The only way to get a tapeless balloon to have a greater capacity is to get more working material in the initial bubble. Increasing the film thickness is not an answer, as one and two mil, 6 million cubic foot balloons supporting themselves would develop stresses of 1250 p.s.i. and 900 p.s.i. respectively, and of course their altitude capabilities would be drastically low.

One approach which has been considered is placing a cap just in the bubble area which would increase the amount of film being stressed at a modest increase in balloon weight. For example, a one-half mil cap could be added to the six million cubic foot balloon which would double the amount of film working. In a practical case it would be assumed that the balloon would be partially tailored rather than cylindrical and therefore an approximate balloon weight would exist of under 700 pounds, for example on the order of 500 pounds. At normal allowable stress levels this balloon could support about 1000 pounds or 450 pounds in addition to itself. This is favorable in comparison with experiences with past loads on ½ mil tapeless 6 million cubic foot balloons. Loads up to 300 pounds have been carried, but at dangerous stress levels (gross lift 885 pounds). Heavier caps may be considered, but the problems of sealing and stress transition at the boundary will be greatly compounded.

A second major problem exists in the balloon construction aside from lift capability. As above mentioned, the gas contained in the balloon at launch fills only a small bubble at the crown of the balloon. The vast area of uninflated balloon skin drapes together in a stem or rope from the bubble to the balloon base. This rope of material arranges itself almost completely at random with the result that the loading and stress is very non-uniform with respect to the balloon axis. Some regions will be highly stressed while others may have no stress at all with the low stress resulting at the location where the rope of material has gathered and the high stress resulting at the other side of the balloon where a single layer of material exists. The range of stresses and the maximum stress in a particular balloon cannot be calculated or predicted because of the randomness of the drape pattern and the location of the drape can be located only after the balloon is inflated for launching. Certainly, in some cases the stress exceeds material strengths resulting in balloon failure. Most balloon failures occur at mid-altitudes, during ascent, and it is suspected that this unequal stressing is the second most important contributing cause (after low temperature effects).

It is accordingly an object of the present invention to provide a balloon construction and method of making a balloon wherein a tapeless balloon envelope is provided which is capable of obtaining substantially uniform stress on the balloon material for the full length of the balloon without encountering the disadvantages of cylindrical or tailored balloons of the type heretofore constructed.

A further object of the invention is to provide an improved balloon envelope structure with excess material above and/or below the balloon equator wherein the excess material will keep itself arranged uniformly around the balloon circumference and will not gather or rope such as has been the case heretofore with balloons which provide excess material for carrying vertical loads.

A still further object of the invention is to provide an improved balloon structure and method of making wherein a "tailored" design can be obtained with substantially the exact amount of additional material provided above and below the balloon equator for carrying vertical loads but the excess material does not interfere with the balloon shape and is conveniently attached to the balloon film in separate strips beside each of the balloon seams.

A further object of the invention is to provide an improved method of making a balloon capable of obtaining uniform vertical stress throughout the balloon length which can be made in a simplified and improved manner providing a more conveniently handled balloon envelope both in transporting and arranging before launching and during inflation and launching.

A still further object of the invention is to provide an improved balloon envelope structure which operates as to have simulated various thickness material with the same functional effect as though a material were chosen which would gradually increase in thickness at the equator, or at a point spaced from the equator, to the balloon end with the thickness progressing to a degree to maintain uniform tensile strength in a vertical direction.

Other objects, advantages and features will become more apparent with the teaching of the principles of the invention in connection with the disclosure of th preferred embodiments thereof in the specification, claims and drawings, in which:

FIGURE 1 is an elevational view of a balloon shown in flight, which is constructed in accordance with the principles of the present invention;

FIGURE 2 is an enlarged fragmentary view of the upper end of the balloon;

FIGURES 2a and 2b are schematic plan views of balloon gores illustrating shapes of gores which may be employed in the balloon of FIGURES 1 and 2;

FIGURE 3 is a detailed enlarged sectional view taken substantially along line III—III of FIGURE 2;

FIGURES 4 and 5 are enlarged sectional views similar to FIGURE 3 but showing modified forms of the invention;

FIGURE 6 is a fragmentary elevational view illustrating another construction or arrangement of balloon gores in accordance with the principles of the present invention;

FIGURES 7 and 8 are horizontal sectional views taken substantially along line VI—VI of FIGURE 6 and illustrating two slight modifications employing the arrangement of FIGURE 6;

FIGURE 9 is a schematic top plan view of a balloon structure of the type heretofore used illustrating the functional problem in the use of the balloon; and FIGURE 10 is a schematic top plan view of a balloon of the present invention.

On the drawings:

FIGURE 1 illustrates a balloon 10 after it has ascended to floating altitude, carrying a pay load 11. The balloon is formed in gores 12, 13 and 14 which, as illustrated in FIGURE 2, are attached to each other by seams 15 and 16.

The balloon material is of a conventional type such as light-weight polyethylene on the order of 1 mil in thickness and the seams are either formed by cement or heat sealed to join the gas barrier material of the gores and form gas tight seams. The seams 15 and 16 which join the bores are shaped to follow the contour of the balloon envelope and form an envelope which will assume the shape desired, such as the "natural shape."

The seam lines are illustrated in FIGURES 2a and 2b following the lines 15 and 16 of the gores 13' and 13". The gore 13' is rectangular in shape, and the gore 13" is tailored. With the rectangular gore 13' of FIGURE 2a, a balloon will result which is capable of maximum vertical load and will sustain uniform material stress for the full length of the balloon. The gore 13" of FIGURE 2b will be used where a load is to be carried less than that which would vertically stress the center of the gore at the balloon equator (as indicated at location E) to its maximum allowable stress point, and the ends of the gore are then reduced in width to a width which will carry the vertical load to be encountered and sustain the desired maximum vertical stress.

The strips of material 17 and 18 beside the seams 15 and 16 are carried on the balloon surface at each of the seams to act in a structural or a load bearing capacity. The seams 15 and 16 follow a line which determines the profile of the balloon envelope according to a tailored balloon pattern. The balloon structure however has a substantial advantage over a conventional tailored tapeless balloon in that the material is better deployed during inflation and launch, producing enlarged capacity.

The distribution of the strips 38 of vertical load carrying material is shown in FIGURE 10, as compared with the extra material 36 of a conventional tailored tapeless or a cylindrical balloon as shown in FIGURE 9.

In the conventional tailored tapeless balloon 35, FIGURE 9, there is a great deal of material in excess of the bubble circumference as shown by the circumference of the balloon 35 with the excess material being gathered at 36. In a typical case the circumference of the bubble at launch might be 90 feet whereas the balloon contains 180 feet of material. The excess comes together at one side forming a rope at 36 which not only is half of the material carrying the load but the load physically is off at one side causing very unsymmetrical stress.

In the present simulated variable thickness balloon 37, the excess material is shown at 38 in the uniformly distributed separate strips. These strips result in the load being carried on center, and in the excess material being distributed uniformly circumferentially around the balloon to each assume their uniform proportion of the excess vertical load.

It of course is recognized that the excess material could be left inside the balloon as well as outside although the outside arrangement is preferred since the surface of the balloon envelope provides some support for the strips when they flatten against the balloon surface.

The principle of the simulated variable thickness obtained by the uniformly distributed strips can be employed at the top end or at the bottom end of the balloon alone or may be employed at both ends.

As will be observed, the shaping of the balloon envelope by the seams provides strips such as 17 and 18 of progressively or gradually increasing width from the equator of the balloon to the end or from some point above the equator to the end.

The structure of the strips relative to the balloon envelope and the method of making the balloon in accordance with the principles of the invention may be varied as illustrated. In FIGURE 3 the strips are shown as having raw edges with the gores 12, 13 and 14 joined by seams 15 and 16 spaced inwardly from the edges of the gores to provide a strip 17 which is doubled, being furnished by the edges 12b and 13a of the gores 12 and 13. Similarly, the strip 18 is doubled provided by the raw edges or strips 13b and 14a at the edges of the gores 13 and 14.

In other words, the balloon envelope is formed of panel areas which extend between the seams 15 and 16 and the edges of the gores provide strips outside of the seams with the strips tapering and increasing in width toward the balloon end.

In making the balloon of FIGURE 3, the gores will be merely brought together and their edges doubled as shown in FIGURE 3, and the seams 15 and 16 formed.

In the arrangement of FIGURE 4 a preliminary balloon envelope may first be formed, such as of a cylindrical shape by forming seams 19 and 20. This preliminary balloon envelope is then modified by forming additional or second seams 15 and 16 spaced inwardly from the first seams 19 and 20 so as to provide the load carrying strips 17 and 18. The strips, as before, are formed by the edges 12b, 13a, 13b and 14a of the gores.

FIGURE 5 illustrates an arrangement wherein panel sections 21, 22 and 23 are formed from a continuous material, and load carrying strips 24 and 25 are provided by taking tucks in the material and forming seams 26 and 27 at the base of the tucks. The tucks of course provide the strips 24 and 25 which taper in accordance with the illustration shown in FIGURE 2 and the seams follow the profile line to obtain the desired balloon shape. The strips 17 and 18 will usually be wider than they appear in FIGURE 2, where they are abbreviated for the sake of illustration, since sufficient material is provided to obtain uniform unit stress in the balloon material from the equator to the top.

FIGURES 6, 7 and 8 illustrate additional methods wherein gores 28, 29 and 30 may be laid substantially flat and sequentially overlapped.

In other words, the end of the gore 29 is laid over the gore 28 and the end of the next gore is laid over the gore 29, and so forth.

As illustrated in FIGURE 7, seams such as 31 and 32 are run down the center of the overlapped portions 28b and 29a, joining panels 28, 29 and 30.

FIGURE 8 illustrates another location for the seams with seam 33 and 34 running down the outer edges of the portions 38b and 29b, joining panels or gores 28, 29 and 30.

In operation as the bubble of gas forms in the upper end of the balloon before launching, the vertical stresses are uniformly assumed by all of the material at the balloon end. The material of the envelope skin 37 of FIGURE 10 and the material of the load supporting strips 38 receive uniform vertical stress and the amount of material provided is selected by design to carry the load to be encountered. The width of the strips 38 increases toward the end of the balloon so as to provide a uniform quantity of material to the balloon end thus obtaining a true simulated variable thickness balloon effect. As will be apparent from the foregoing, the weight of the pay load at the bottom of the balloon envelope is transferred to the material of the balloon envelope. This creates a vertical stress on the material which is shared by the material in the gore and by the extra strength bearing material which is attached to the gores. This permits providing a tailored balloon having a predetermined shape wherein the profile is determined by the relationship of the seams and extra strength bearing material is provided which does not affect or interfere with the desired shape.

Thus I have provided a balloon which meets the objectives and advantages above set forth. The balloon construction requires the same amount of material as in designs heretofore employed and thus the weight of the balloon has not changed, but the load carrying ability is substantially enhanced since all of the material available will work uniformly.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A balloon structure comprising,
    a balloon envelope having upper and lower ends and having a wall of light-weight flexible gas barrier material,
    seams extending vertically for at least a portion of the envelope length joining gore portions of the balloon envelope,
    and load-carrying vertical strips on at least one end secured to the balloon wall,
        said strips gradually increasing in width toward the balloon end.

2. A balloon structure comprising,
    a balloon envelope having upper and lower ends and having a wall of light-weight flexible gas barrier material,
    seams extending vertically for at least a portion of the envelope length joining gore portions of the balloon envelope,
    and strips of gas barrier material on at least one end secured to the balloon wall,
        said strips progressively increasing in width toward the balloon end.

3. A balloon structure comprising,
    a balloon envelope formed of a plurality of vertical gores of light-weight gas barrier material,
    and seams joining said gores inwardly of the gore edges to form the envelope with unfinished edges of the gores projecting beside the seams forming strips for sustaining vertical forces on the balloon envelope,
        said strips having progressively increasing width toward the end of the balloon.

4. A balloon structure comprising,
    a balloon envelope formed of a plurality of vertical gores of light-weight gas barrier material,
        the edges of said gorse overlapping each other,
    and seams joining the overlapped gores a distance inwardly from the gore edge,
        the distance between the seam and gore edge increasing toward the balloon end forming a strip of increasing width beside the seam.

5. A balloon structure comprising,
    a balloon envelope formed of a plurality of vertical gores of light-weight gas barrier material,
        the edges of said gores overlapping each other,
    and seams joining the overlapped gores,
        the distance between the overlapped edges of adjacent gores increasing toward the end of the balloon.

6. A balloon structure comprising,
    a balloon envelope formed of a plurality of vertical gores of light-weight gas barrier material,
        the edges of said gores overlapping each other,
    first seams joining the overlapped gores a distance inwardly from the gore edges,
        the distance between the seams and the gore edges increasing toward the balloon end forming strips of increasing width beside the seams,
    and second seams joining the edges of said strips so that the width of the strips between the first and second seams increases toward the balloon end.

References Cited by the Examiner
UNITED STATES PATENTS

| | | | |
|---|---|---|---|
| 2,767,941 | 10/56 | Gegner et al. | 244—31 |
| 2,858,090 | 10/58 | Winzen et al. | 244—31 |
| 2,960,282 | 11/60 | Winzen | 244—31 |
| 3,063,656 | 11/62 | Bohl et al. | 244—31 |
| 3,109,611 | 11/63 | Yost | 244—31 |
| 3,109,612 | 11/63 | Winker et al. | 244—31 |
| 3,113,748 | 12/63 | Struble | 244—31 |

FERGUS S. MIDDLETON, *Primary Examiner.*